US009946998B1

(12) United States Patent
Acharya (10) Patent No.: US 9,946,998 B1
(45) Date of Patent: Apr. 17, 2018

(54) SYSTEM AND METHOD FOR ELECTRONIC DEPOSIT OF A FINANCIAL INSTRUMENT BY BANKING CUSTOMERS FROM REMOTE LOCATIONS BY USE OF A DIGITAL IMAGE (71) Applicant: JPMorgan Chase Bank, N.A., New York, NY (US)

(72) Inventor: Ravi V. Acharya, Philadelphia, PA (US)

(73) Assignee: JPMorgan Chase Bank, N.A., New York, NY (US)

( * ) Notice: Subject to any disclaimer, the term of this patent is extended or adjusted under 35 U.S.C. 154(b) by 170 days.

(21) Appl. No.: 14/265,506

(22) Filed: Apr. 30, 2014

Related U.S. Application Data

(63) Continuation of application No. 11/890,605, filed on Aug. 7, 2007, now Pat. No. 8,768,836, which is a
(Continued)

(51) Int. Cl.
*G06Q 20/00* (2012.01)
*G06Q 20/10* (2012.01)
(Continued)

(52) U.S. Cl.
CPC ......... *G06Q 20/108* (2013.01); *G06F 17/243* (2013.01); *G06Q 20/40* (2013.01)

(58) Field of Classification Search
CPC .... G07D 7/20; G07D 11/009; G06K 2209/01; G06K 9/60; H04N 2201/0084;
(Continued)

(56) References Cited

U.S. PATENT DOCUMENTS 3,653,480 A 4/1972 Yamamoto et al.
3,833,885 A * 9/1974 Gentile ............... G07F 19/20
235/379

(Continued)

FOREIGN PATENT DOCUMENTS

EP 421808 4/1991
EP 1014318 6/2000
(Continued)

OTHER PUBLICATIONS

A microprocessor-based optical character recognition check reader by Chin, F. 1 ; Wu; Proceedings of the Third International Conference on Document Analysis and Recognition : 982-5 vol. 2;2 vol. xxvi+1188. IEEE Comput. Soc. Press. (1995) (Year: 1995).*
(Continued)

*Primary Examiner* — Sarah M Monfeldt
*Assistant Examiner* — Mary M Gregg
(74) *Attorney, Agent, or Firm* — Hunton & Williams LLP (57) ABSTRACT

A system and method for initiating a deposit transaction, where the depositor is a banking customer located at a remote location, and where the item to be deposited is a financial instrument, such as a paper check from a third party, payable to the depositor. The enabling system features a Remote Customer Terminal (RCT) with certain input devices, connected to a bank system. An image and/or other data of the financial instrument are transmitted from the RCT to the Bank of First Deposit (BOFD) where the data may be processed by conversion to Electronic Funds Transfer (EFT), via Electronic Check Presentment (ECP), or via check reconstruction. The deposit transaction can be accomplished without physical transfer of the financial instrument to or through the bank system. The system and method provide convenience and improved transaction processing speed compared to other deposit transactions of financial instruments.

17 Claims, 3 Drawing Sheets

Related U.S. Application Data continuation-in-part of application No. 09/506,434, filed on Feb. 18, 2000, now abandoned.

(51) Int. Cl.
  *G06Q 20/40* (2012.01)
  *G06F 17/24* (2006.01)

(58) Field of Classification Search
  CPC ............. G06Q 20/108; G06Q 20/0425; G06Q 20/389; G06Q 20/042; G06Q 20/32; G07F 19/00
  See application file for complete search history.

(56) References Cited

U.S. PATENT DOCUMENTS

| | | |
|---|---|---|
| 4,050,375 A | 9/1977 | Orleans |
| 4,141,078 A | 2/1979 | Bridges et al. |
| 4,205,780 A | 6/1980 | Burns et al. |
| 4,264,808 A | 4/1981 | Owens et al. |
| 4,321,672 A | 3/1982 | Braun et al. |
| 4,396,985 A | 8/1983 | Ohara |
| RE31,692 E | 10/1984 | Tyburski et al. |
| 4,495,018 A | 1/1985 | Vohrer |
| 4,536,647 A * | 8/1985 | Atalla ................... G06Q 20/02 235/379 |
| 4,617,457 A | 10/1986 | Myers |
| 4,672,377 A | 6/1987 | Murphy |
| 4,694,397 A | 9/1987 | Grant et al. |
| 4,700,055 A | 10/1987 | Kashkashian, Jr. |
| 4,713,761 A | 12/1987 | Sharpe et al. |
| 4,752,877 A | 6/1988 | Roberts et al. |
| 4,797,913 A | 1/1989 | Kaplan |
| 4,799,156 A | 1/1989 | Shavit |
| 4,807,177 A | 2/1989 | Ward |
| 4,812,628 A | 3/1989 | Boston et al. |
| 4,823,264 A | 4/1989 | Deming |
| 4,893,333 A | 1/1990 | Baran et al. |
| 4,931,793 A | 6/1990 | Fuhrmann et al. |
| 4,939,674 A | 7/1990 | Price et al. |
| 4,948,174 A | 8/1990 | Thomson et al. |
| 4,974,878 A | 12/1990 | Josephson |
| 4,975,841 A | 12/1990 | Kehnemuyi et al. |
| 4,988,849 A | 1/1991 | Sasaki |
| 4,992,646 A | 2/1991 | Collin |
| 4,992,940 A | 2/1991 | Dworkin |
| 5,023,904 A | 6/1991 | Kaplan |
| 5,053,607 A | 10/1991 | Carlson |
| 5,054,096 A | 10/1991 | Beizer |
| 5,080,748 A | 1/1992 | Bonomi |
| 5,111,395 A | 5/1992 | Smith |
| 5,115,374 A * | 5/1992 | Hongoh ................... 361/679.09 |
| 5,121,945 A | 6/1992 | Thomson et al. |
| 5,122,950 A | 6/1992 | Mee |
| 5,136,502 A | 8/1992 | Van Remortel et al. |
| 5,175,682 A | 12/1992 | Higashiyama |
| 5,187,750 A | 2/1993 | Behera |
| 5,198,975 A | 3/1993 | Baker et al. |
| 5,220,501 A | 6/1993 | Lawlor |
| 5,225,978 A | 7/1993 | Peterson |
| 5,237,159 A | 8/1993 | Stephens |
| 5,265,007 A | 11/1993 | Barnhard, Jr. et al. |
| 5,283,829 A | 2/1994 | Anderson |
| 5,287,269 A | 2/1994 | Dorrough et al. |
| 5,311,594 A | 5/1994 | Penzias |
| 5,315,508 A | 5/1994 | Bain et al. |
| 5,321,238 A | 6/1994 | Watanabe |
| 5,326,959 A | 7/1994 | Perazza |
| 5,336,870 A | 8/1994 | Hughes |
| 5,349,170 A | 9/1994 | Kern |
| 5,350,906 A | 9/1994 | Brody et al. |
| 5,367,581 A | 11/1994 | VanHorn |
| 5,373,550 A | 12/1994 | Campbell |
| 5,396,417 A | 3/1995 | Burks et al. |
| 5,402,474 A | 3/1995 | Miller |
| 5,412,190 A | 5/1995 | Kopesec |
| 5,424,938 A | 6/1995 | Wagner |
| 5,430,644 A | 7/1995 | Deaton et al. |
| 5,432,506 A | 7/1995 | Chapman |
| 5,444,794 A | 8/1995 | Uhland |
| 5,444,841 A | 8/1995 | Glasser et al. |
| 5,446,740 A | 8/1995 | Yien |
| 5,448,471 A | 9/1995 | Deaton et al. |
| 5,459,482 A | 10/1995 | Orlen |
| 5,465,206 A | 11/1995 | Hilt et al. |
| 5,477,040 A | 12/1995 | Lalonde |
| 5,479,494 A | 12/1995 | Clitherow |
| 5,483,445 A | 1/1996 | Pickering |
| 5,484,988 A | 1/1996 | Hills |
| 5,502,576 A | 3/1996 | Ramsay et al. |
| 5,504,677 A | 4/1996 | Pollin |
| 5,506,691 A | 4/1996 | Bednar et al. |
| 5,508,731 A | 4/1996 | Kohorn |
| 5,513,250 A | 4/1996 | McAllister |
| 5,532,464 A | 7/1996 | Josephson et al. |
| 5,544,043 A | 8/1996 | Miki et al. |
| 5,544,046 A | 8/1996 | Niwa |
| 5,550,734 A | 8/1996 | Tater |
| 5,551,021 A | 8/1996 | Harada |
| 5,557,515 A | 9/1996 | Abbruzzese et al. |
| 5,563,400 A | 10/1996 | Le Roux |
| 5,566,330 A | 10/1996 | Sheffield |
| 5,568,489 A | 10/1996 | Yien |
| 5,570,465 A | 10/1996 | Tsakanikas |
| 5,572,004 A | 11/1996 | Raimann |
| 5,583,759 A | 12/1996 | Geer |
| 5,583,760 A | 12/1996 | Klesse |
| 5,590,196 A | 12/1996 | Moreau |
| 5,590,197 A | 12/1996 | Chen |
| 5,592,377 A | 1/1997 | Lipkin |
| 5,592,378 A | 1/1997 | Cameron |
| 5,599,528 A | 2/1997 | Igaki |
| 5,603,025 A | 2/1997 | Tabb |
| 5,615,109 A | 3/1997 | Eder |
| 5,621,201 A | 4/1997 | Langhans |
| 5,640,577 A | 6/1997 | Scharmer |
| 5,642,419 A | 6/1997 | Rosen |
| 5,649,117 A | 7/1997 | Landry |
| 5,652,786 A | 7/1997 | Rogers |
| 5,659,165 A | 8/1997 | Jennings |
| 5,659,469 A | 8/1997 | Deaton et al. |
| 5,659,741 A | 8/1997 | Eberhardt |
| 5,666,493 A | 9/1997 | Wojcik et al. |
| 5,677,955 A * | 10/1997 | Doggett ................. G06Q 20/02 235/379 |
| 5,679,938 A | 10/1997 | Templeton |
| 5,679,940 A | 10/1997 | Templeton |
| 5,687,250 A | 11/1997 | Curley et al. |
| 5,692,132 A | 11/1997 | Hogan |
| 5,699,528 A | 12/1997 | Hogan |
| 5,703,344 A | 12/1997 | Bezy et al. |
| 5,704,044 A | 12/1997 | Tarter et al. |
| 5,708,422 A | 1/1998 | Blonder et al. |
| 5,715,298 A | 2/1998 | Rogers |
| 5,715,314 A | 2/1998 | Payne |
| 5,715,399 A | 2/1998 | Bezos |
| 5,717,989 A | 2/1998 | Tozzoli et al. |
| 5,724,424 A | 3/1998 | Gifford |
| 5,727,153 A | 3/1998 | Powell |
| 5,748,780 A | 5/1998 | Stolfo |
| 5,751,842 A | 5/1998 | Eccles |
| 5,757,917 A | 5/1998 | Rose et al. |
| 5,770,843 A | 6/1998 | Rose et al. |
| 5,774,553 A | 6/1998 | Rosen |
| 5,783,808 A | 7/1998 | Josephson |
| 5,784,696 A | 7/1998 | Melnikof |
| 5,793,861 A | 8/1998 | Haigh |
| 5,794,221 A | 8/1998 | Egendorf |
| 5,802,498 A | 9/1998 | Comesanas |
| 5,802,499 A | 9/1998 | Sampson et al. |
| 5,819,236 A | 10/1998 | Josephson |
| 5,819,238 A | 10/1998 | Fernholz |
| 5,826,241 A | 10/1998 | Stein |
| 5,826,245 A | 10/1998 | Sandberg-Diment |

(56) References Cited

U.S. PATENT DOCUMENTS

| | | |
|---|---|---|
| 5,832,447 A | 11/1998 | Rieker |
| 5,832,460 A | 11/1998 | Bednar |
| 5,832,464 A | 11/1998 | Houvener et al. |
| 5,832,488 A | 11/1998 | Eberhardt |
| 5,835,580 A | 11/1998 | Fraser |
| 5,835,603 A | 11/1998 | Coutts |
| 5,835,899 A | 11/1998 | Rose et al. |
| 5,852,812 A | 12/1998 | Reeder |
| 5,859,419 A | 1/1999 | Wynn |
| 5,864,609 A | 1/1999 | Cross et al. |
| 5,870,456 A | 2/1999 | Rogers |
| 5,870,721 A | 2/1999 | Norris |
| 5,870,723 A | 2/1999 | Pare |
| 5,870,725 A | 2/1999 | Bellinger et al. |
| 5,873,072 A | 2/1999 | Kight |
| 5,878,141 A | 3/1999 | Daly et al. |
| 5,883,810 A | 3/1999 | Franklin et al. |
| 5,884,288 A | 3/1999 | Chang |
| 5,884,290 A | 3/1999 | Smorodinsky et al. |
| 5,897,625 A | 4/1999 | Gustin |
| 5,898,157 A | 4/1999 | Mangili et al. |
| 5,903,881 A | 5/1999 | Schrader |
| 5,910,896 A | 6/1999 | Hahn-Carlson |
| 5,910,988 A | 6/1999 | Ballard |
| 5,915,246 A | 6/1999 | Patterson et al. |
| 5,917,965 A | 6/1999 | Cahill et al. |
| 5,920,847 A | 7/1999 | Kolling et al. |
| 5,930,778 A | 7/1999 | Geer |
| 5,940,811 A | 8/1999 | Norris |
| 5,940,844 A | 8/1999 | Cahill et al. |
| 5,943,656 A | 8/1999 | Crooks |
| 5,945,653 A | 8/1999 | Walker et al. |
| 5,956,700 A | 9/1999 | Landry |
| 5,963,659 A | 10/1999 | Cahill et al. |
| 5,963,925 A | 10/1999 | Kolling et al. |
| 5,966,698 A | 10/1999 | Pollin |
| 5,978,780 A | 11/1999 | Watson |
| 5,987,435 A | 11/1999 | Weiss et al. |
| 5,987,436 A | 11/1999 | Halbrook |
| 5,987,439 A | 11/1999 | Gustin et al. |
| 5,991,750 A | 11/1999 | Watson |
| 6,000,832 A | 12/1999 | Franklin et al. |
| 6,003,762 A | 12/1999 | Hayashida |
| 6,006,208 A | 12/1999 | Forst et al. |
| 6,009,442 A | 12/1999 | Chen et al. |
| 6,014,636 A | 1/2000 | Reeder |
| 6,016,482 A | 1/2000 | Molinari et al. |
| 6,016,484 A | 1/2000 | Williams et al. |
| 6,018,718 A | 1/2000 | Walker et al. |
| 6,021,202 A * | 2/2000 | Anderson et al. ............... 705/54 |
| 6,026,388 A | 2/2000 | Liddy et al. |
| 6,029,139 A | 2/2000 | Cunningham et al. |
| 6,032,133 A | 2/2000 | Hilt et al. |
| 6,032,137 A | 2/2000 | Hallard |
| 6,035,281 A | 3/2000 | Crosskey et al. |
| 6,035,285 A | 3/2000 | Schlect et al. |
| 6,035,287 A | 3/2000 | Stallaert et al. |
| 6,038,553 A | 3/2000 | Hyde, Jr. |
| 6,041,312 A | 3/2000 | Bickerton et al. |
| 6,041,315 A | 3/2000 | Pollin |
| 6,044,362 A | 3/2000 | Neely |
| 6,045,039 A | 4/2000 | Stinson et al. |
| 6,047,261 A | 4/2000 | Siefert |
| 6,052,674 A | 4/2000 | Zervides et al. |
| 6,058,380 A | 5/2000 | Anderson et al. |
| 6,058,381 A | 5/2000 | Nelson |
| 6,061,665 A | 5/2000 | Bahreman |
| 6,064,764 A | 5/2000 | Bhaskaran et al. |
| 6,064,987 A | 5/2000 | Walker et al. |
| 6,065,675 A | 5/2000 | Teicher |
| 6,067,524 A | 5/2000 | Byerly et al. |
| 6,070,150 A | 5/2000 | Remington et al. |
| 6,070,798 A | 6/2000 | Nethery |
| 6,073,104 A | 6/2000 | Field |
| 6,073,113 A | 6/2000 | Guinan |
| 6,076,072 A | 6/2000 | Libman |
| 6,078,907 A | 6/2000 | Lamm |
| 6,081,790 A | 6/2000 | Rosen |
| 6,085,168 A | 7/2000 | Mori et al. |
| 6,088,683 A | 7/2000 | Jalili |
| 6,088,685 A | 7/2000 | Kiron et al. |
| 6,088,686 A | 7/2000 | Walker et al. |
| 6,092,056 A | 7/2000 | Tull, Jr. et al. |
| 6,098,053 A | 8/2000 | Slater |
| 6,098,070 A | 8/2000 | Maxwell |
| 6,105,011 A | 8/2000 | Morrison, Jr. |
| 6,108,639 A | 8/2000 | Walker et al. |
| 6,110,044 A | 8/2000 | Stern |
| 6,111,858 A | 8/2000 | Greaves et al. |
| 6,115,690 A | 9/2000 | Wong |
| 6,119,106 A | 9/2000 | Mersky et al. |
| 6,119,107 A | 9/2000 | Polk |
| 6,125,354 A | 9/2000 | MacFarlane et al. |
| 6,128,602 A | 10/2000 | Northington et al. |
| 6,128,603 A | 10/2000 | Dent et al. |
| 6,129,273 A | 10/2000 | Shah |
| 6,138,118 A | 10/2000 | Koppstein et al. |
| 6,144,946 A | 11/2000 | Iwamura |
| 6,148,293 A | 11/2000 | King |
| 6,149,055 A | 11/2000 | Gatto |
| 6,149,056 A | 11/2000 | Stinson et al. |
| 6,173,272 B1 | 1/2001 | Thomas et al. |
| 6,181,837 B1 | 1/2001 | Cahill et al. |
| 6,185,544 B1 | 2/2001 | Sakamoto et al. |
| 6,189,785 B1 | 2/2001 | Lowery |
| 6,202,054 B1 | 3/2001 | Lawlor et al. |
| 6,205,433 B1 | 3/2001 | Boesch et al. |
| 6,213,391 B1 | 4/2001 | Lewis |
| 6,227,447 B1 | 5/2001 | Campisano |
| 6,233,565 B1 | 5/2001 | Lewis et al. |
| 6,233,566 B1 | 5/2001 | Levine et al. |
| 6,236,972 B1 | 5/2001 | Shkedy |
| 6,240,444 B1 | 5/2001 | Fin et al. |
| 6,243,689 B1 | 6/2001 | Norton |
| 6,278,981 B1 | 8/2001 | Dembo et al. |
| 6,289,322 B1 | 9/2001 | Kitchen et al. |
| 6,292,789 B1 | 9/2001 | Schutzer |
| 6,301,379 B1 | 10/2001 | Thompson et al. |
| 6,301,567 B1 | 10/2001 | Leong et al. |
| 6,304,858 B1 | 10/2001 | Mosler et al. |
| 6,321,212 B1 | 11/2001 | Lange |
| 6,324,524 B1 | 11/2001 | Lent et al. |
| 6,334,003 B1 | 12/2001 | Yokota |
| 6,338,047 B1 | 1/2002 | Wallman |
| 6,338,049 B1 | 1/2002 | Walker et al. |
| 6,343,279 B1 | 1/2002 | Bissonette et al. |
| 6,363,164 B1 | 3/2002 | Jones et al. |
| 6,363,364 B1 | 3/2002 | Nel |
| 6,363,365 B1 | 3/2002 | Kou |
| 6,366,967 B1 | 4/2002 | Wagner |
| 6,374,235 B1 | 4/2002 | Chen et al. |
| 6,390,362 B1 | 5/2002 | Martin |
| 6,393,409 B2 | 5/2002 | Young et al. |
| 6,405,173 B1 | 6/2002 | Honarvar et al. |
| 6,415,259 B1 | 7/2002 | Wolfinger et al. |
| 6,418,419 B1 | 7/2002 | Nieboer et al. |
| 6,418,420 B1 | 7/2002 | DiGiorgio et al. |
| 6,418,430 B1 | 7/2002 | DeFazio et al. |
| 6,434,159 B1 | 8/2002 | Woodward et al. |
| 6,446,072 B1 | 9/2002 | Schulze et al. |
| 6,460,020 B1 | 10/2002 | Pool et al. |
| 6,490,568 B1 | 12/2002 | Omara et al. |
| 6,493,685 B1 | 12/2002 | Ensel et al. |
| 6,535,896 B2 | 3/2003 | Britton et al. |
| 6,536,663 B1 | 3/2003 | Lozier et al. |
| 6,554,185 B1 | 4/2003 | Montross et al. |
| 6,574,350 B1 | 6/2003 | Rhoads et al. |
| 6,574,377 B1 | 6/2003 | Cahill et al. |
| 6,578,000 B1 | 6/2003 | Dodrill et al. |
| 6,578,015 B1 | 6/2003 | Haseltine et al. |
| 6,609,113 B1 | 8/2003 | O'Leary et al. |
| 6,609,125 B1 | 8/2003 | Layne et al. |
| 6,629,081 B1 | 9/2003 | Cornelius et al. |
| 6,636,615 B1 | 10/2003 | Rhoads et al. |

(56) References Cited

U.S. PATENT DOCUMENTS

| | | | |
|---|---|---|---|
| 6,658,393 B1 | 12/2003 | Basch et al. | |
| 6,661,910 B2 * | 12/2003 | Jones et al. | 382/135 |
| 6,704,714 B1 | 3/2004 | O'Leary et al. | |
| 6,721,715 B2 | 4/2004 | Nemzow | |
| 6,728,397 B2 | 4/2004 | McNeal | |
| 6,796,488 B1 | 9/2004 | Saffarian | |
| 6,820,058 B2 | 11/2004 | Wood et al. | |
| 6,825,940 B1 | 11/2004 | Wu et al. | |
| 6,860,375 B2 | 3/2005 | Hallowell et al. | |
| 6,954,896 B1 | 10/2005 | Dodrill et al. | |
| 6,965,882 B1 | 11/2005 | Lapstun et al. | |
| 6,970,259 B1 | 11/2005 | Lunt et al. | |
| 6,970,855 B2 | 11/2005 | Das et al. | |
| RE38,957 E | 1/2006 | Laussermair et al. | |
| 7,004,382 B2 | 2/2006 | Sandru | |
| 7,062,456 B1 | 6/2006 | Riehl et al. | |
| 7,068,832 B1 | 6/2006 | Price et al. | |
| 7,090,122 B1 * | 8/2006 | Warren et al. | 235/379 |
| 7,104,443 B1 | 9/2006 | Paul et al. | |
| 7,133,846 B1 | 11/2006 | Ginter et al. | |
| 7,177,836 B1 | 2/2007 | German et al. | |
| 7,200,255 B2 | 4/2007 | Jones et al. | |
| 7,313,543 B1 | 12/2007 | Crane et al. | |
| 7,317,823 B1 | 1/2008 | Price et al. | |
| 7,337,148 B2 | 2/2008 | Xie et al. | |
| 7,349,884 B1 | 3/2008 | Odom | |
| 7,380,707 B1 | 6/2008 | Fredman | |
| 7,401,048 B2 | 7/2008 | Rosedale et al. | |
| 7,624,050 B1 * | 11/2009 | Drummond | G06F 3/04895 235/379 |
| 2001/0011222 A1 | 8/2001 | McLauchlin et al. | |
| 2001/0018666 A1 | 8/2001 | Sugiyama et al. | |
| 2001/0018739 A1 | 8/2001 | Anderson et al. | |
| 2001/0032139 A1 | 10/2001 | Debonnet, Jr. | |
| 2001/0037300 A1 | 11/2001 | Miyazaki et al. | |
| 2001/0037309 A1 | 11/2001 | Vrain | |
| 2001/0047334 A1 | 11/2001 | Nappe et al. | |
| 2001/0047489 A1 | 11/2001 | Ito et al. | |
| 2001/0051533 A1 | 12/2001 | Wietzke et al. | |
| 2002/0012445 A1 | 1/2002 | Perry | |
| 2002/0013728 A1 | 1/2002 | Wilkman | |
| 2002/0023055 A1 | 2/2002 | Antognini et al. | |
| 2002/0026394 A1 | 2/2002 | Savage et al. | |
| 2002/0038363 A1 | 3/2002 | MacLean | |
| 2002/0046169 A1 | 4/2002 | Keresman et al. | |
| 2002/0050526 A1 | 5/2002 | Swartz et al. | |
| 2002/0052842 A1 | 5/2002 | Schuba et al. | |
| 2002/0055907 A1 | 5/2002 | Pater et al. | |
| 2002/0069134 A1 | 6/2002 | Solomon | |
| 2002/0072976 A1 | 6/2002 | Virtanen et al. | |
| 2002/0077978 A1 | 6/2002 | O'Leary et al. | |
| 2002/0082985 A1 | 6/2002 | MacKay | |
| 2002/0084321 A1 | 7/2002 | Martens et al. | |
| 2002/0087415 A1 | 7/2002 | Allen et al. | |
| 2002/0087468 A1 | 7/2002 | Ganesan et al. | |
| 2002/0087469 A1 | 7/2002 | Ganesan et al. | |
| 2002/0091635 A1 | 7/2002 | Dilip et al. | |
| 2002/0100803 A1 | 8/2002 | Sehr | |
| 2002/0107170 A1 | 8/2002 | Meyer et al. | |
| 2002/0107788 A1 | 8/2002 | Cunningham | |
| 2002/0111837 A1 | 8/2002 | Aupperle | |
| 2002/0128981 A1 | 9/2002 | Kawan et al. | |
| 2002/0138398 A1 | 9/2002 | Kalin et al. | |
| 2002/0169658 A1 | 11/2002 | Adler | |
| 2002/0170966 A1 | 11/2002 | Hannigan et al. | |
| 2002/0178071 A1 | 11/2002 | Walker et al. | |
| 2002/0184151 A1 | 12/2002 | Maloney | |
| 2002/0194096 A1 | 12/2002 | Falcone et al. | |
| 2002/0198817 A1 | 12/2002 | Dhir | |
| 2002/0199182 A1 | 12/2002 | Whitehead | |
| 2003/0018557 A1 | 1/2003 | Gilbert et al. | |
| 2003/0037002 A1 | 2/2003 | Higgins et al. | |
| 2003/0040959 A1 | 2/2003 | Fei et al. | |
| 2003/0046218 A1 | 3/2003 | Albanese et al. | |
| 2003/0055675 A1 | 3/2003 | Klein Twennaar | |
| 2003/0055756 A1 | 3/2003 | Allan | |
| 2003/0069780 A1 | 4/2003 | Hailwood et al. | |
| 2003/0097335 A1 | 5/2003 | Muskowitz et al. | |
| 2003/0105641 A1 | 6/2003 | Lewis | |
| 2003/0110442 A1 | 6/2003 | Battle | |
| 2003/0120686 A1 | 6/2003 | Kim et al. | |
| 2003/0130945 A1 | 7/2003 | Force et al. | |
| 2003/0130952 A1 | 7/2003 | Bell et al. | |
| 2003/0144942 A1 | 7/2003 | Sobek | |
| 2003/0187789 A1 | 10/2003 | Karas et al. | |
| 2003/0191710 A1 | 10/2003 | Green et al. | |
| 2003/0200107 A1 | 10/2003 | Allen et al. | |
| 2003/0208421 A1 | 11/2003 | Vicknair et al. | |
| 2003/0208441 A1 | 11/2003 | Poplawski et al. | |
| 2003/0225663 A1 | 12/2003 | Horan et al. | |
| 2003/0233305 A1 | 12/2003 | Solomon | |
| 2003/0237046 A1 | 12/2003 | Parker et al. | |
| 2004/0064409 A1 | 4/2004 | Kight et al. | |
| 2004/0078328 A1 | 4/2004 | Talbert et al. | |
| 2004/0133516 A1 | 7/2004 | Buchanan et al. | |
| 2004/0201735 A1 | 10/2004 | Baron | |
| 2004/0228514 A1 | 11/2004 | Houle et al. | |
| 2005/0021466 A1 | 1/2005 | Buchanan et al. | |
| 2005/0033690 A1 | 2/2005 | Antognini et al. | |
| 2005/0055254 A1 | 3/2005 | Schmidtberg et al. | |
| 2005/0086178 A1 | 4/2005 | Xie et al. | |
| 2005/0091156 A1 | 4/2005 | Hailwood et al. | |
| 2005/0097046 A1 | 5/2005 | Singfield | |
| 2005/0097050 A1 | 5/2005 | Orcutt | |
| 2005/0144059 A1 | 6/2005 | Schuessler | |
| 2005/0177480 A1 | 8/2005 | Huang | |
| 2005/0209954 A1 | 9/2005 | Asher et al. | |
| 2005/0261955 A1 | 11/2005 | Humble et al. | |
| 2006/0103893 A1 * | 5/2006 | Azimi | H04N 1/00212 358/474 |
| 2006/0106650 A1 | 5/2006 | Bush | |
| 2006/0106717 A1 | 5/2006 | Randle et al. | |
| 2006/0136335 A1 | 6/2006 | Ferguson | |
| 2006/0161501 A1 | 7/2006 | Waserstein et al. | |
| 2006/0178986 A1 | 8/2006 | Giordano et al. | |
| 2006/0206427 A1 | 9/2006 | Love et al. | |
| 2006/0282389 A1 | 12/2006 | Gupte | |
| 2006/0287953 A1 | 12/2006 | Chauhan | |
| 2007/0138255 A1 | 6/2007 | Carreon et al. | |
| 2007/0266130 A1 * | 11/2007 | Mazur | G06Q 20/12 709/223 |
| 2008/0193008 A1 | 8/2008 | Mount et al. | |

FOREIGN PATENT DOCUMENTS

| | | |
|---|---|---|
| JP | 02311059 A * | 12/1990 |
| WO | WO 91/16691 | 10/1991 |
| WO | WO 93/08545 | 4/1993 |
| WO | WO 94/28497 | 12/1994 |
| WO | WO 96/08783 | 3/1996 |
| WO | WO 96/12242 A1 | 4/1996 |
| WO | WO 97/14108 | 4/1997 |
| WO | WO 97/45796 | 12/1997 |
| WO | WO 97/45814 | 12/1997 |
| WO | WO 98/09260 | 3/1998 |
| WO | WO 99/10823 | 3/1999 |
| WO | WO 00/39979 | 7/2000 |
| WO | WO 01/75730 A2 | 10/2001 |
| WO | WO 02/063432 A2 | 8/2002 |
| WO | WO 2004/079603 | 9/2004 |

OTHER PUBLICATIONS

Hunt, Robert M., An Introduction to the Economics of Payment Card Networks.
Annual Report Pursuant to Sectin 13 or 15(d) of the Securities Exchange Act of 1934, Form 10-K, Intelidata Technologies Corporation, Fiscal Year Ended Dec. 31, 2001.
Blockbuster running test of a stored value card, The American Banker, Sep. 1, 1995.
CES/NaBANCO introduces stored value card technology blockbuster video is first merchant partner, Business Wire, Inc., Jan. 15, 1996.

(56) References Cited

OTHER PUBLICATIONS

Card Flash Daily Payment Card News, www.cardweb.com, printed Sep. 23, 2004.
Anonymous, Chase Manhattan introduces new FEDI payables product, ProQuest document ID: 7806951, ISSN/ISBN: 02686635, May 1995.
Bills, Chase Pact Done, What's Next for Web Vendors?, The American Banker, Technology Section, Jun. 3, 2002, p. 23.
Reinbach, Chase steps up treasury system, ProQuest documednt ID 8723558, ISSN/ISBN: 10459472, Nov. 1995.
Anonymous, Chasing the global trend, Cash Management News, proQuest document ID 9319923, ISSN/ISBN: 02686635, Dec. 1995.
Malhotra, Clearing House Enumerates e-Payments IIIs, The American Banker, vol. 167, No. 154, Aug. 23, 2002.
Marjanovic, Corporate Services: Chase Gears Up Global Payments System Series: 16, The American Banker, vol. 160, Issue 174, Sep. 11, 1995, p. 41.
Gluck, Creating a Global Cash-Management Game Plan, Bank Systems & Technology, Feb. 1997, p. 28.
Lamond, Credit Card Transactions Real World and Online, Paying by Credit Card—Real World and Online, http://www.virtualschool.edu/mon/ElectronicProperty/klamond/credit, printed Jul. 8, 2005, 17 pages.
Lamond, Keith, Credit Card Transactions Real World and Online, http://www.virtualschool.edu/mon/ElectronicProperty/klamond/credit_card.htm, pp. 1-17, printed Jul. 8, 2005.
Dialog file 20, #10279554; Offer: Book Yourself Free Cassettes; Mar. 25, 2000; Birmingham Post, p. 16.
Du Pont's Electronic Payments, Corporate EFT Report, v9, n1, Dialog file 636, Accession No. 01066902, Jan. 11, 1989.
Carreker, Electronic check presentment: Capturing new technology, http://proquest.umi.com, Banking Management, Rolling Meadows: vol. 71, Issue 2, Mar./Apr. 1995, p. 32, 5 pages.
Fidelity Helps Fund Sellers Trim the Taxes They'll Owe, The Wall Street Journal, Nov. 7, 2002.
First Data markets stored-value cards, Cards International, Jan. 30, 1996, p. 5.
Norris, First data unit develops blockbuster cash card, Omaha World Hearld Sunrise Edition, Business Section, Jan. 19, 1996, p. 16.
Harsh Truth: Your Investments Likely Won't Make Any Money. Money, Initial Launch to 200 Credit Unions, USA Today.com, Jun. 27, 2002.
Decovny, Net Scope, Banking Technology, May 1997.
Nokia Announces the World's First NFC Enabled Mobile Product for Contactless Payment and Ticketing, PRNewswire, Feb. 9, 2005.
Armstrong, Douglas, Norwest eases difficulty of Interstate banking Bank's customers may use the same account number at any branch.
Goode, on Profit, Loss and the Mysteries of the Mind, The New York Times, Nov. 5, 2002.
Anonymous, Operating in a multi-currency environment, ProQuest document ID 9215937, ISSN/ISBN 09589309, Oct. 1995.
Maher and Troutman, Payor's Prescription for Painless Migration to Electronic Healthcare Payments and Remittance Advices, PNC Bank, Dec. 2001.
Maturi, Richard, Personal Finance; When you Need to Send Cash in a Flash.
Press Release, Mar. 5, 2004, Payment Data Systems Files Patent on Debit Card Payment Solution, American City Business Journals, Inc., Mar. 5, 2004.
Maher and Troutman, Provider's Prescription for Painless Migration to Receipt of Electronic Healthcare Payments and Remittance Advices, PNC Bank, Dec. 2001.
Anonymous, Systems spell change for foreign exchange, Global Investor, ProQuest document ID 1056152B, ISSN/ISBN: 09513604, Nov. 1996.
French, Tech Stocks: Market Movers, Investors Worry CheckFree Being Chased from Its Own Game, http://www.thestreet.com, Jun. 20, 2002.
Technology, In Brief Wachovia-InteliData Deal, May 7, 2002.
Zuckerman, The Hedge-Fund Craze, The Wall Street Journal, Jun. 12, 2002.
McDonald, The Stars in the Sky Flicker, and Fund Stars Do the Same, The Wall Street Journal, Jan. 15, 2003.
Anonymous, Visa & Carnegie Mellon Plan Online Payment Scheme, Newsbyte News Network, Feb. 15, 1995.
Financial News, Wells Fargo Rolls Out Nationwide Lockbox Check Conversion, PR Newswire Association, Apr. 22, 2003.
Terrie Miller and Henry Yan, When Custody Governs, Benefits Canada, Toronto, Feb. 1998, vol. 22, Issue 2, p. 33, 5 pages.
Joachim, David S., "Sparing Paper Checks That Last Trip to the Bank," The New York Times, (Nov. 9, 2006), p. C.6.
Brink's Selects NetDeposit as Remote Capture Partner, Today, (Oct. 2004), vol. 26, Iss. 5, p. 8.
First Union Division Offers Check Processing at POS by Bob Curly; Bank Systems & Technology; May 1999; 36, 5; Proquest; p. 40; 1 page.

* cited by examiner

SYSTEM AND METHOD FOR ELECTRONIC DEPOSIT OF A FINANCIAL INSTRUMENT BY BANKING CUSTOMERS FROM REMOTE LOCATIONS BY USE OF A DIGITAL IMAGE

RELATED APPLICATIONS

This application is a continuation of U.S. patent application Ser. No. 11/890,605, filed Aug. 7, 2007, which is a continuation-in-part of U.S. patent application Ser. No. 09/506,434, filed Feb. 18, 2000, the disclosures of each of which are hereby incorporated in their entirety.

FIELD OF THE INVENTION

The invention relates generally to a system and method for initiating a deposit transaction, where the depositor is a banking customer located at a remote location, where the item is to be deposited without physical transport of the item to a bank and where the item to be deposited is a financial instrument, e.g. a paper check, from a third party (i.e., other than the bank customer or the paying bank), payable to the depositor, where the banking customer has or creates a digital image of the financial instrument.

As used herein, a "bank" may be a bank or other financial institution, and a "financial instrument" may be any financial instrument, including paper-based financial instruments such as checks or other negotiable instruments, now known or later developed.

BACKGROUND OF THE INVENTION

Methods and systems for initiating electronic financial transactions from remote locations are increasingly common. Examples are the use of Automated Teller Machines (ATMs) to withdraw cash, and the use of telephonic systems and personal computers to initiate a transfer of funds between banking customer accounts, or to pay bills. Such transactions are commonly referred to as Electronic Funds Transfer (EFT).

Two principal advantages of EFT, from the perspective of the banking customer, are convenience and speed. They are convenient to the extent that they do not require banking customers to physically visit the bank in order to initiate a financial transaction. Electronic transactions are also completed more quickly than those involving paper instruments and/or documents that must be physically routed to different locations in order to complete the transaction. A significant disadvantage of present EFT systems, however, is that they are not equipped to accept certain financial instruments, such as paper checks, as part of the transaction. Since it is estimated that paper check volume in the United States exceeds sixty billion annually, this is a significant drawback.

Some approaches have been disclosed for converting paper checks to electronic transactions. Using an approach commonly known as Electronic Check Presentment (ECP), a bank of first deposit (the bank first receiving a paper check for deposit, hereinafter BOFD) will capture an electronic image of the check or otherwise convert the check to an electronic transaction for processing through a clearing house and the paying bank. The image of the check and/or check data essentially take the place in the settlement process of the paper check for the purposes of payment. For a general description of the ECP process, see U.S. Pat. No. 5,237,159. While the ECP method may speed transaction time, it offers no improvement in convenience for the banking customer who must still initiate the transaction by physically delivering the paper check to the bank.

A related approach allows a banking customer to write a paper check for purchases at the point-of-sale, typically a retail store, where the transaction is then converted into either an EFT or ECP transaction. Under this method, however, the banking customer is the payor. No provision is made for the deposit of checks by a payee.

Existing systems that perform electronic banking transactions are either not equipped to handle certain financial instruments such as paper checks, are configured only for bank-to-bank transactions, or do not accept third party checks for deposit. The resulting lack of convenience, and other drawbacks, limits the utility of such systems for bank customers.

SUMMARY OF THE INVENTION

It is one object of the invention to provide a system and method for allowing banking customers to deposit financial instruments, including third-party checks, from remote locations without physically transporting the financial instruments to the bank.

It is another object of the invention to provide a system and method that would allow banking customers to initiate such deposit transactions at home, providing convenience and a level of independence for banking customers who are confined to their homes.

It is another object of the invention to provide a method that would allow banking customers to deposit financial instruments, such as third party checks, at ATM machines. Most ATMs simply provide a means for holding paper checks until they are collected for processing. The present invention would make ATMs more useful by providing for electronic deposit of financial instruments, such as third party checks.

It is another object of the invention to provide alternative methods for the BOFD system to process such transactions. By identifying a system and method for deposit that is compatible with ECP, EFT and reconstructed check processing, banks will have practical alternatives in the implementation of this new approach. Further, banks can execute such deposit transactions without having to physically receive and/or process the physical financial instrument.

To achieve these and other objects of the invention, a payee would deposit a financial instrument, such as a third party paper check, using a Remote Customer Terminal (RCT) that can communicate with a BOFD system. The payee may prepare, or receive from a third party, a digital image of the financial instrument that is to be deposited. Software and/or hardware accessible at or through the RCT can "recognize" data in or on the digital image of the financial instrument. Such data could include data contained in the MICR line, RTN, account number, amount of financial instrument, date of financial instrument or any other characters present in or on the digital image of the financial instrument. Recognition can be made of such data, whether in human-visible or machine readable form. Alternatively or additionally, the banking customer can input data taken from the financial instrument, or the digital image of the financial instrument, directly into the RCT. In general terms, the RCT may be equipped to "accept" digital images and data regarding the financial instrument. The digital image of the financial instrument and/or data recognized from the financial instrument or inputted into the RCT by the banking customer is transmitted from the RCT to the BOFD system. The BOFD system can process the deposit transaction in several different fashions.

In one embodiment of the invention, the RCT is located at home, and comprises a digital camera, or a personal computer or wireless handheld device, such as a Blackberry® or Palm Treo®, having digital imaging capabilities such as an attached image scanner or a digital camera. To initiate the transaction, the banking customer uses an Internet-based application loaded on the RCT to access the BOFD system. A pre-assigned Personal Identification Number (PIN) or other password or secret, including a biometric, may be required to allow the banking customer access to the BOFD system. Either when prompted or prior to accessing the BOFD system, the banking customer captures the digital image of the financial instrument by the scanner or the digital camera and prepares a file storing the digital image. Upon prompting by the BOFD system, the banking customer forwards the digital image to the BOFD system along with the data that was either "recognized" from the digital image of the financial instrument or was input into the RCT by the banking customer. Alternatively, the customer may input data regarding the financial instrument directly into the BOFD system.

The automated system can provide immediate provisional credit from the BOFD system to the banking customer, and forward the digital image of the financial instrument and other data to a clearing house in the form of an ECP transaction. Once the transaction has cleared the paying bank, the BOFD system issues a permanent credit to the banking customer. Accordingly, the banking customer has initiated deposit of a financial instrument from a third party, such as a paper check, from the convenience of his/her own home using a digital image of the financial instrument and without having to physically present the financial instrument to the BOFD system, with the speed of an electronic transaction.

Certain actions can be taken to prevent redeposit of the same financial instrument. For example, if the banking customer is in possession of the physical financial instrument, the financial instrument may be marked at the RCT by a printer using human- or machine-readable ink to prevent redeposit. Alternatively, the RCT may further comprise a storage vault, and the financial instrument may be physically "captured" thus preventing redeposit. Another embodiment comprises checking identification information of the financial instrument, such as serial number and any other identifying information, against a database to see if the financial instrument has been previously deposited. If it is determined that the financial instrument has been previously deposited, redeposit can be denied by the BOFD system.

The following drawings and descriptions further describe the invention, including several different embodiments of the major system components and processes. The construction of such a system, implementation of such a process, and advantages will be clear to a person skilled in the art of automated financial transactions.

BRIEF DESCRIPTION OF THE DRAWINGS

Purposes and advantages of the exemplary embodiments will be apparent to those of ordinary skill in the art from the following detailed description in conjunction with the appended drawings in which like reference characters are used to indicate like elements, and in which.

These and other embodiments and advantages will become apparent from the following detailed description, taken in conjunction with the accompanying drawings, illustrating by way of example the principles of the various exemplary embodiments.

DETAILED DESCRIPTION OF THE INVENTION

As indicated above, the invention is directed to a system and method for the deposit of financial instruments, such as third party checks, using a digital image of the financial instrument from remote locations by banking customers.

Overview of the System

Figure 1:
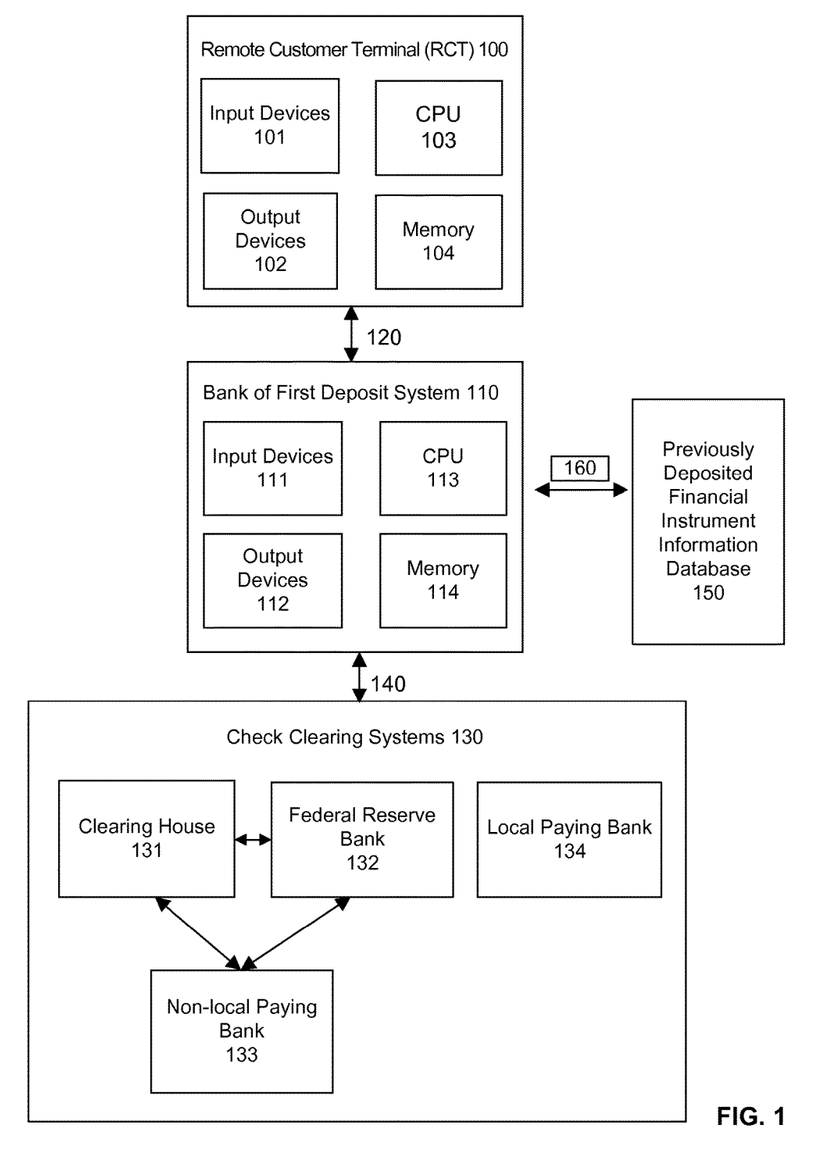
FIG. 1 is schematic diagram of the system, according to one embodiment of the invention.

FIG. 1 is schematic diagram of the system, according to one embodiment of the invention. The key components are a Remote Customer Terminal (RCT) 100 that is connected to a Bank of First Deposit (BOFD) system 110.

The RCT 100 may be a telephone, digital camera, fax machine, personal computer, ATM, cell phone, PDA or any other computer, apparatus, wireless handheld device such as a Blackberry® or Palm Treo® or system capable of collecting data and communicating with BOFD system 110. For instance, the RCT 100 may comprise a workstation or other device running the Microsoft Windows™ NT™, Windows™ 2000, Windows Vista™, Windows XP™, Windows Mobile™, Unix, Linux, Xenix, IBM AIX, Hewlett-Packard UX, Novell Netware™, Sun Microsystems Solaris™, OS/2™, BeOS™, Mach, Apache, OpenStep™, Mac OS X™, GAME BOY™, PXP™ or any other operating system or platform now known or later developed. RCT 100 may also comprise two or more such devices.

Additionally, the RCT 100 may comprise certain input devices 101, output devices 102, Central Processing Unit (CPU) 103, and machine-readable electronic memory 104.

The RCT input devices 101 may comprise a keypad, a keyboard, a microphone, a Magnetic Ink Character Reader (MICR), a Digital Image Scanner (DIS), a digital camera, any other digital imaging capabilities now known or later developed, a bar code scanner, a mouse, a touch screen, a voice reader, a voice recognizer, a dialogue screen, a menu box, a list, a checkbox, a toggle switch, a pushbutton or any other device that allows a user to receive information regarding the operation of the processing machine as it processes a set of instructions and/or provide the CPU 103 with information. The information provided to the CPU 103 may be in the form of a command, a selection of data, or some other input, for example.

The RCT output devices 102 may comprise a speaker, a display unit, a paper printer, or any other output device that can communicate a message to a human or a machine.

The RCT memory 104 may comprise a database that might use any desired arrangement of files such as a flat file arrangement or a relational database arrangement, for example. RCT memory 104 may be contained on any of a wide variety of media or medium utilized to hold instructions and/or data used in the invention and may take on any of a variety of physical forms or transmissions. RCT memory 104, for example, may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, communications channel, a satellite transmission or other remote transmission.

Certain instructions may also be stored in RCT memory 104 and executed by the CPU 103, for example, to assist in communication and data collection functions. For example, optical character recognition software may be used in conjunction with the DIS or the digital camera to convert machine printed characters on the financial instrument or the digital image of the financial instrument to electronic text. Likewise, intelligent character recognition software may be used to convert handwritten characters on the financial instrument or on the digital image of the financial instrument to electronic text. Additionally, any browser, such as Netscape Navigator™, Internet Explorer™ or Mozilla Firefox™, may be used for Internet communications.

Software may also be stored in RCT memory 104 and executed by CPU 103 that is capable of "recognizing" machine-readable data in or on the digital image of the financial instrument. Such data could include data included in the MICR line or data that may be included in a financial instrument in, for example, a bar code.

Alternatively or additionally, the banking customer can input data from the financial instrument, or the digital image of the financial instrument, directly into the RCT 100 using input devices 101 such as keypad, keyboard or microphone.

The digital image of the financial instrument, along with data input into the RCT 100 from the financial instrument, can be stored in a file in RCT memory 104 or on other memory now known or later developed.

The BOFD system 110 may comprise a telephone, a cellular phone, a facsimile machine, a personal computer, a mainframe computer, a personal digital assistant (PDA), a wireless handheld device such as a Blackberry® or Palm Treo® or any other computer, apparatus, or system capable of receiving data from the RCT 100, and initiating a deposit transaction. Like RCT 100, BOFD system 110 may comprise a workstation running the Microsoft Windows™ NT™, Windows™ 2000, Windows Vista™, Windows XP™, Windows Mobile®, Unix, Linux, Xenix, IBM AIX, Hewlett-Packard UX, Novell Netware™, Sun Microsystems Solaris™, OS/2™, BeOS™, Mach, Apache, OpenStep™, Mac OS X™, GAME BOY™, PXP™ or any other operating system or platform now known or later developed. Also like the RCT 100, the BOFD system 110 may comprise input devices 111, output devices 112, CPU 113, and electronic memory 114. The BOFD system 110 may further comprise an attended operator terminal with or without display, or it may be fully automated comprising a VRU in conjunction with CTI.

Additionally, the BOFD system 110 is broadly defined to include such network servers or other devices necessary to perform functions such as communication, data collection, and preparation of electronic transactions. Data collection, for example, may be implemented by hosting a World Wide Web site on an Internet server. Further, reference to singular components, such as CPU 113 and electronic memory 114, is not intended to be limiting and BOFD system 110 may comprise a plurality of CPUs 113 and electronic memories 114, whether located in a single physical location or located in different physical locations.

The RCT 100 and BOFD system 110 communicate with each other via a communication link 120. The link may operate through a network, such as by direct dial connection to the Internet over a telephone network. It may be accomplished via point-to-point communication, such as with a dedicated line or via the Internet, an intranet, a PAN (Personal Area Network), a LAN (Local Area Network), a WAN (Wide Area Network) or a MAN (Metropolitan Area Network), a frame relay connection, an Advanced Intelligent Network (AIN) connection, a synchronous optical network (SONET) connection, a digital T1, T3 or E1 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or FDDN (Fiber Distributed Data Networks) or CDDI (Copper Distributed Data Interface) connections. Communications link 120 may furthermore be, include or access any one or more of a WAP (Wireless Application Protocol) link, a GPRS (General Packet Radio Service) link, a GSM (Global System for Mobile Communication) link, a CDMA (Code Division Multiple Access) or TDMA (Time Division Multiple Access) link such as a cellular phone channel, a GPS (Global Positioning System) link, CDPD (cellular digital packet data), a RIM (Research in Motion, Limited) duplex paging type device, a Bluetooth™ radio link, or an IEEE 802.11-based radio frequency link. Communications link 120 may yet further be, include or access any one or more of an RS-232 serial connection, an IEEE-1394 (Firewire) connection, an IrDA (infrared) port, a SCSI (Small Computer Serial Interface) connection, a USB (Universal Serial Bus) connection or other wired or wireless, digital or analog interface or connection. Any type of communication link that is capable of transmitting data, by wired or wireless methods, between RCT 100 and BOFD system 110 is suitable for use in the invention, whether now known or later developed.

Communications over communication link 120 may be secure to safeguard against theft of transmitted data. For example, communications along communications link 120 may be encrypted using any method of encryption now known or later developed, including but not limited to symmetric key encryption such as DES, IDEA or AES, asymmetric or public key encryption, checksums, cyclic redundancy checks, message authentication codes, digital signatures, or combinations or variations of the foregoing.

Additionally, the BOFD system 110 may be connected to one or more check clearing systems 130 via a communication link 140. The check clearing systems may comprise for-profit clearing houses 131, Federal Reserve banks 132, and local paying banks 134. The clearing houses 131 and Federal Reserve banks 132 may in turn have means for communication with non-local paying banks 133.

Further, the BOFD system 110 may include or be connected via a communication link 160 to one or more databases 150 that include information on financial instruments that have been previously deposited.

As with link 120, links 140 and 160 may be accomplished through any number of schemes for networked or point-to-point communications. Communications along links 140 and 160 may also be encrypted as for link 120 for security of information that is transmitted along those links.

The next two sections provide a description of a method for depositing financial instruments as provided by the invention.

Overview of the Information Flow from the Customer Perspective

Figure 2:
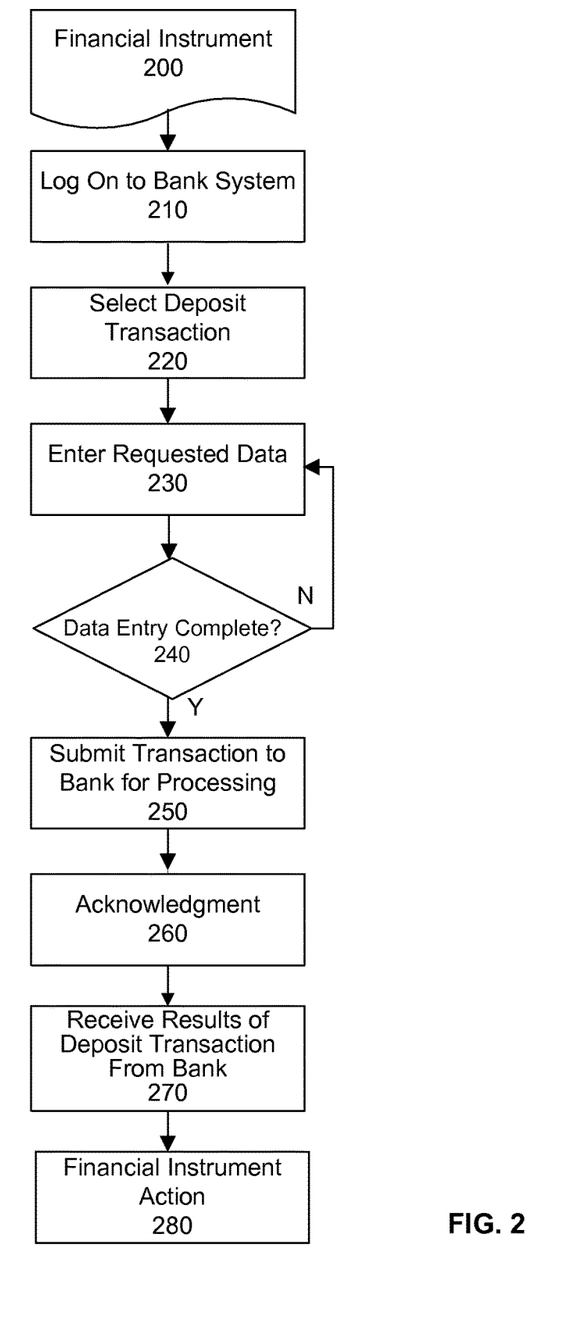
FIG. 2 is a flow diagram from the perspective of a banking customer, according to one embodiment of the invention.

FIG. 2 is a diagram illustrating the flow of information from the perspective of a banking customer, according to one embodiment of the present invention.

The process begins when the banking customer receives a financial instrument payable to him/her 200. The financial instrument may be drawn on the banking customer's bank, a local bank, a non-local bank in the United States, or a foreign bank. Alternatively, the banking customer may receive a digital image of a financial instrument payable to him/her.

The banking customer may then "log on" to the BOFD system 110 from a RCT 100 using a Personal Identification Number (PIN), password, secret and/or other means of identification 210. Any means of verifying the banking customer's identification may be used, including biometrics such as retinal scan, fingerprint, voice recognition, DNA, handprint recognition or handwriting recognition (alone or in combination), or any other identification means now known or later developed. The banking customer may then select "deposit" from a menu of transaction options 220 as presented by the BOFD system 110.

In step 230, the banking customer may respond to prompts for each item of data needed to deposit the financial instrument. In one embodiment, the banking customer may enter a predetermined set of data all at once, for example where all data input fields are visible on the display screen of the RCT 100. The banking customer may be prompted to supply additional information in step 240 if the BOFD system 110 requests information not entered previously by the banking customer.

In another embodiment, either before logging on to the BOFD system 110 or during a session initiated by logging in, the banking customer may prepare a digital image of the financial instrument using DIS or a digital camera, or any other method of preparing a digital image now known or later developed. Additionally or alternatively, the banking customer may receive a digital image of the financial instrument from the payor. The banking customer may store the digital image of the financial instrument in the RCT memory 104.

Additionally, the banking customer may access software stored in the RCT memory 104 that can "recognize" data in or on the digital image of the financial instrument and store that data in the RCT memory 104. This data may be stored in the same file as the digital image of the financial instrument, or it may be stored in a different memory location. If stored in different locations, the files storing the digital image and the data may be linked. In another embodiment, in addition or alternatively, the banking customer may enter data into the RCT memory 104 using RCT input devices 101 such as the keypad, keyboard or microphone for storage. Further, the digital image of the financial instrument may be stored in RCT memory 104 either before the session initiated by logging on to the BOFD system 110, or during the session.

Data may comprise customer identification, customer account number, name of payor, name and routing number of payor's bank, the amount of the financial instrument, an image of the financial instrument, along with other information.

Upon prompting by the BOFD system 110 during the session, the banking customer may submit the data taken from the financial instrument, along with the digital image of the financial instrument, to the BOFD system 110 for processing 250, and may receive acknowledgement from the BOFD system 110 that the transaction is being processed 260. Alternatively, the banking customer may upload the digital image of the financial instrument and the data from the financial instrument directly to the BOFD system 110 from other storage or using input devices without storing that digital image and data into RCT memory 104. For example, memory devices such as "thumb" drives, non-persistent memory devices or any other method of storing a digital image and data that can be accessed for uploading to the BOFD system 110 are suitable.

In another embodiment, two or more devices may comprise the RCT 110. For example, the banking customer may prepare a digital image of the financial instrument and/or enter data taken from the financial instrument into a device such as a digital camera, a cell phone or a PDA, transmit that information to a workstation such as a personal computer and then log into the BOFD system 110 from the workstation. In yet another embodiment, the banking customer may prepare a digital image of the financial instrument with a device such as a digital camera, a cell phone or a PDA, transmit the digital image to a workstation such as a personal computer, enter data taken from the financial instrument into an input device in communication with the workstation and then log into the BOFD system 110 from the workstation. Any combination of devices and input devices may comprise the RCT 100.

The banking customer may receive a response 270 indicating, for example, that immediate provisional credit for the deposit of the financial instrument has been given, that full credit has been awarded, or that the transaction request has been denied, according to bank procedures.

If credit was issued, the financial instrument may be subjected to certain actions 280 in order to prevent re-deposit of the same financial instrument. One possible action is that the financial instrument is marked, for example, by human or machine readable ink. Alternatively, the financial instrument may be physically captured by the RCT 100, for example, via deposit into an ATM vault.

In one embodiment, the banking customer may log onto BOFD system 110 and check the status of a deposit transaction. In another embodiment, the BOFD system 110 may notify the banking customer that there is missing or erroneous information or data regarding the financial instrument or deposit transaction request, or there are outstanding questions regarding the deposit transaction request, in which case the banking customer may log onto the BOFD system 110 and input missing or erroneous information or data or provide answers to outstanding questions. In another embodiment, the banking customer may access BOFD system 110 and access previously inputted data to check for correctness, to correct erroneous inputted data or to make other alterations to the deposit transaction request. For example, the banking customer may request that the deposit be placed in a different account than was originally requested, that some of the deposit amount be credited to an outstanding account such as a loan or a credit account or that some of the deposit amount be placed in a stored value account.

Overview of the Information Flow from the Bank Perspective

Figure 3:
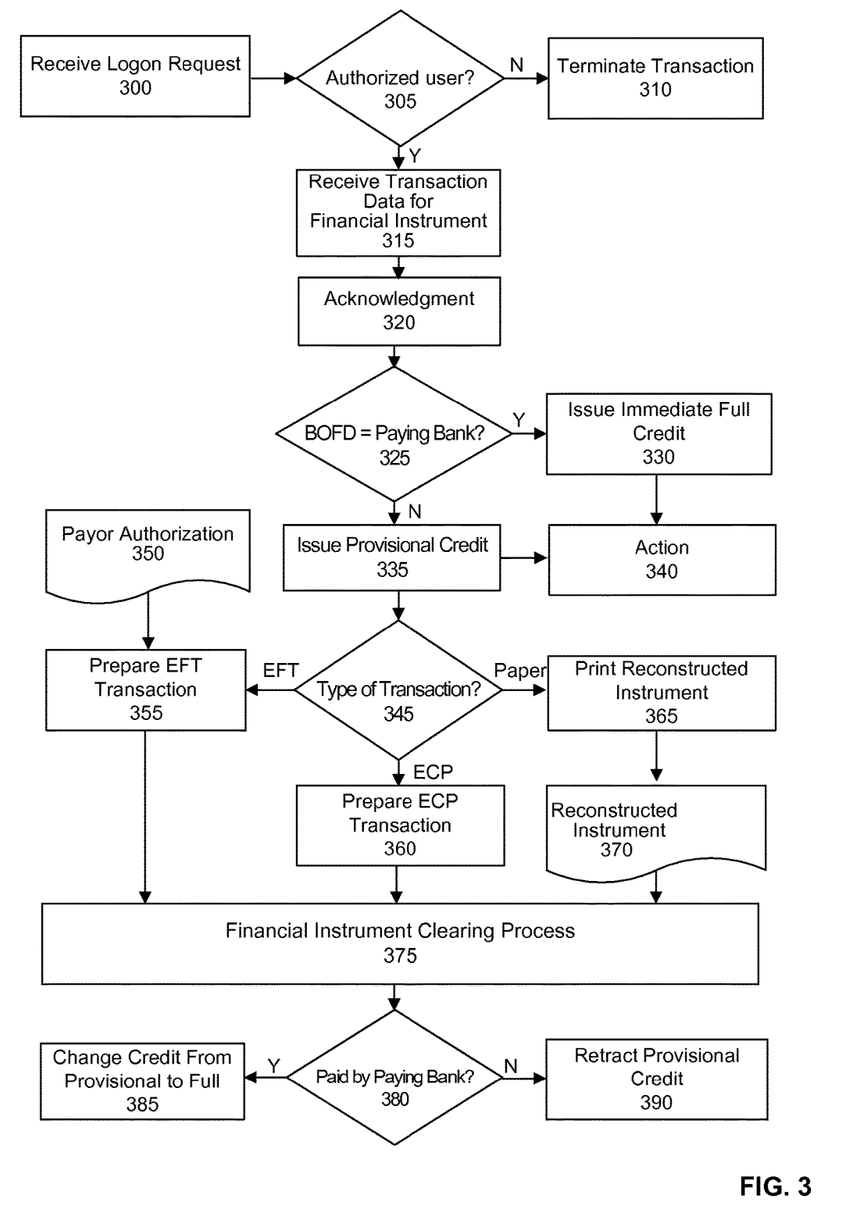
FIG. 3 is a flow diagram from the perspective of the BOFD system, according to one embodiment of the invention.

FIG. 3 is a diagram illustrating the flow of information from the perspective of the BOFD system, according to one embodiment of the invention.

The process may begin with a logon request 300 from the banking customer. A security function 305 may terminate the process for any unauthorized user 310. Once the banking customer has been authorized to access the BOFD system 110, the authorized user may be promoted to a data collection step, where data regarding the banking customer and the financial instrument is received 315, and an acknowledgement of receipt is sent to the customer 320.

The BOFD system 110 may review the identity of the paying bank 325. If the BOFD is the paying bank, the BOFD system 110 may issue immediate full credit to the account of the payee banking customer 330. Otherwise, the BOFD system 110 may issue "provisional" credit to the banking customer 335. Regardless of the type of credit issued, the BOFD system 110 may initiate certain actions 340 to prevent redeposit of the same financial instrument (see discussion of step 280 above). This may end the interactive session with the banking customer.

Next, the BOFD system 110 may make a decision concerning the method for "clearing" the financial instrument through another bank 345. If the transaction will be converted to an Electronic Funds Transfer (EFT), the BOFD system 110 may have to obtain a payor authorization 350 to support preparation of the EFT transaction 355 using the financial instrument data that was transmitted from the RCT 100 to the BOFD system 110. Alternatively, the BOFD system 110 may format the transaction for Electronic Check Presentment (ECP) 360 using the financial instrument data that was transmitted from the RCT 100 to the BOFD system 110, according to certain pre-established agreements with the paying bank. If, however, the BOFD system 110 does not have either the payor's authorization for an EFT, or an agreement with the paying bank for ECP, then the BOFD may print a reconstructed check 365 using the financial instrument data that was transmitted from the RCT 100 to the BOFD system 110. In any of these alternatives, the deposit of the financial instrument can be "cleared" without physical receipt of the financial instrument by the BOFD system 110.

In the case of "clearing" using a reconstructed check 370, the clearing process 375 is the traditional method for physically routing a paper financial instrument to the paying bank for payment. In an EFT or ECP transaction, the clearing process 375 may be accomplished by automated systems. The BOFD system 110 may submit the electronic transactions individually, or in batch. The clearing process 375 may involve data transfer directly to a local paying bank, or it may involve transfer of data to a clearing house or Federal Reserve bank for ultimate credit by the paying bank.

The paying bank may issue credit for the financial instrument 380. If credit is given, the BOFD system 110 may change the banking customer's credit from "provisional" to "full" 385. If however, the paying bank fails to pay the financial instrument, the BOFD system 110 may retract the "provisional" credit issued earlier 390.

The specification and examples provided above should be considered exemplary only. It will be evident that various modifications and changes may be made thereto, and additional embodiments may be implemented, without departing from the broader scope of the disclosure. The specification and drawings are accordingly to be regarded in an illustrative rather than restrictive sense.

What is claimed is:

1. A method, comprising:

receiving, by an automated electronic banking system, from a remote customer terminal, a log on request from a banking customer, the log on request comprising identification information associated with the banking customer, wherein the automated electronic banking system comprises at least one computer processor and the remote customer terminal comprises at least one computer processor, at least one digital camera configured to capture a digital image, and optical recognition software configured to convert machine printed characters to electronic text or an intelligent character recognition configured to convert handwritten characters to electronic text from a digital image of a financial instrument, wherein further the automated electronic banking system and the remote customer terminal are communicatively coupled over a computer based network, and wherein the remote customer terminal is a telephone capable of performing these functions;

receiving, by the automated electronic banking system, a request, from the telephone, for depositing a value of a financial instrument;

receiving, by the automated electronic banking system, transaction data associated with the financial instrument that has been entered into an interface on the telephone;

receiving, electronically, by the automated electronic banking system, a digital image of the financial instrument that is transmitted from the telephone, wherein the digital image is taken, prior to transmission, using the at least one digital camera of the telephone;

receiving, electronically, by the automated electronic banking system, an image data set for the financial instrument that is transmitted from the telephone, wherein the image data set is comprised of text converted from the digital image of the financial instrument; and depositing, by the automated electronic banking system, the value of the financial instrument into a bank account based the received transaction data.

2. The method of claim 1, wherein the telephone further comprises at least one of a keypad, a keyboard, or a microphone.

3. The method of claim 1, wherein the bank account comprises a demand deposit account.

4. The method of claim 1, wherein the financial instrument comprises a negotiable instrument.

5. The method of claim 1, wherein the financial instrument comprises a check.

6. The method of claim 1, wherein the result of the transaction comprises a credit to the banking customer's account, a provisional credit to the banking customer payee's account, or a denial of the transaction.

7. The method of claim 1, further comprising subjecting the financial instrument to one or more actions to prevent redeposit of the financial instrument.

8. The method of claim 1, wherein the identification information associated with the banking customer comprises biometric information.

9. The method of claim 1, wherein the banking customer is not required to produce a physical copy of the financial instrument to the financial institution.

10. A system for remote electronic deposit of a financial instrument, the system comprising:

an automated electronic banking portion and a remote customer terminal, the automated electronic banking portion configured to receive, from the remote customer terminal, a log on request from a banking account holder, the log on request comprising identification information associated with the banking account holder, wherein the automated electronic banking portion comprises at least one computer processor and the remote customer terminal is a telephone that comprises at least one computer processor and at least one digital camera configured to capture a digital image, and optical recognition software configured to convert machine printed characters to electronic text or an intelligent character recognition configured to convert handwritten characters to electronic text from a digital image of a financial instrument, and wherein further the automated electronic banking portion and the telephone are communicatively coupled over a computer based network;

the automated electronic banking portion further configured to receive a request from the telephone for depositing a value of a financial instrument, transaction data associated with the financial instrument that has been entered into an interface on the telephone, a digital image of the financial instrument, and an image data set comprising text converted from the digital image of the financial instrument, the digital image and image data set being transmitted from the telephone, and the digital image being stored in a computer memory communicatively coupled to the telephone prior to being transmitted and further the digital image having been received by the banking account holder from a third party prior to being transmitted; and the automated electronic banking portion further configured to deposit the value of the financial instrument into a bank account of the banking account holder based the received transaction data.

11. The system of claim 10, wherein the bank account comprises a demand deposit account.

12. The system of claim 10, wherein the financial instrument comprises a negotiable instrument.

13. The system of claim 10, wherein the financial instrument comprises a check.

14. The system of claim 10, wherein the result of the transaction comprises a credit to the banking customer's account, a provisional credit to the banking customer payee's account, or a denial of the transaction.

15. The system of claim 10, further comprising subjecting the financial instrument to one or more actions to prevent redeposit of the financial instrument.

16. The system of claim 10, wherein the digital image of the financial instrument is stored in a computer memory of the telephone.

17. The system of claim 10, wherein the identification information associated with the banking customer comprises biometric information.

\* \* \* \* \*